E. Hidden,
Commode,

No 29,278. Patented July 24, 1860.

N. PETERS, PHOTO-LITHOGRAPHER, WASHINGTON, D. C.

UNITED STATES PATENT OFFICE.

ENOCH HIDDEN, OF NEW YORK, N. Y.

PORTABLE WATER-CLOSET.

Specification of Letters Patent No. 29,278, dated July 24, 1860.

*To all whom it may concern:*

Be it known that I, ENOCH HIDDEN, of New York, in the county of New York, in the State of New York, have invented certain new and useful Improvements in Portable Water-Closets; and I do hereby declare that the following is a full and exact description thereof, reference being had to the accompanying drawings and to the letters of reference marked thereon.

My invention has for its object to construct a bucket or other vessel, with an impervious cover and otherwise, so that it can be conveniently used as a water closet, and can at the same time be closed so tightly as to emit no odor and shall be perfectly portable, and to these ends my invention consists in the employment in connection with any suitable vessel of a sealing impervious, removable lid, and also in the employment in connection with both of these devices of a removable seat piece as will be hereinafter fully described.

To enable those skilled to make and use my invention I will proceed to describe its construction and operation, referring by letters to the accompanying drawings, forming part of this specification and in which—

Figure 3:
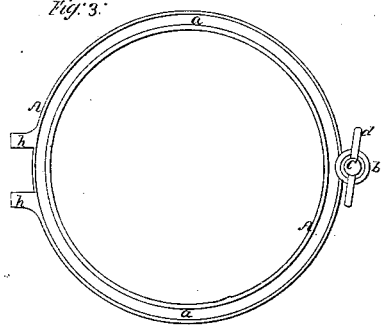
Figure 4:
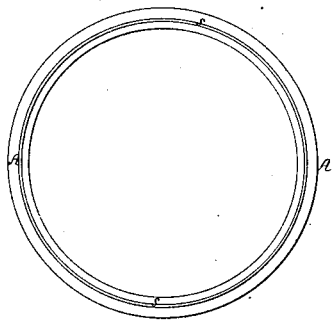
Figure 1:
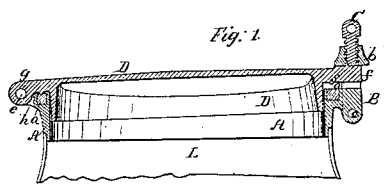
Figure 2:
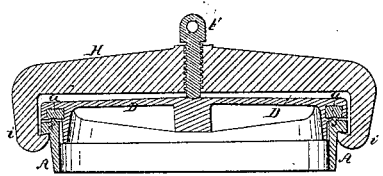
Figure 5:
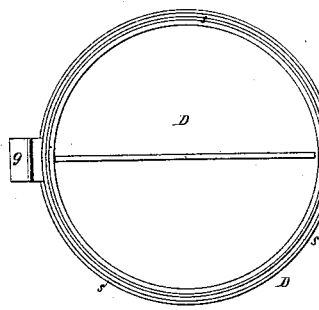
Figure 9:
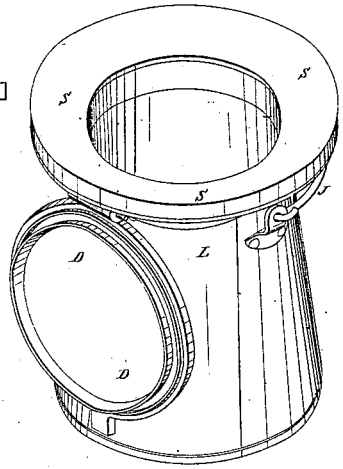
Figure 6:
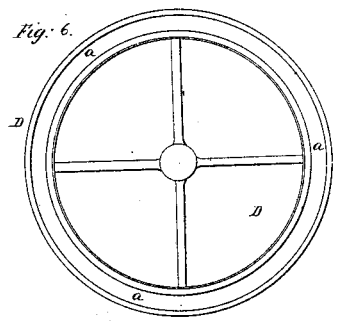
Figure 8:
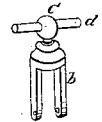
Figure 7:
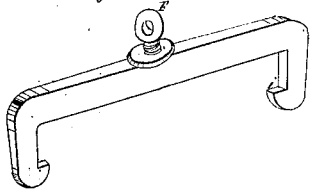
Figure 10:
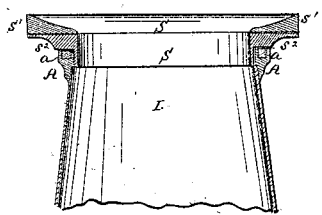

Figure 1, represents a vertical section of the lid and upper portion of the bucket, of one of my portable water closets. Fig. 2, is a similar section of the top rim and covering device of another modification of my invention. Fig. 3, is a top view of the top rim of bucket shown at Fig. 1. Fig. 4, is a top view of the top rim shown at Fig. 2. Fig. 5, is a bottom view of the lid shown at Fig. 1. Fig. 6, is a bottom view of the lid shown at Fig. 2. Fig. 8, is a perspective view of the lid retainer shown in Fig. 1. Fig. 9, is a perspective view of one of my improved water closets showing the application of the seat piece, and Fig. 10, is a vertical section of the same.

In the different views similar letters indicate the same parts of the apparatus.

A, is a metallic annular top rim which is securely and closely fitted onto the top or mouth of any desired kind of vessel in figure it is shown attached to the top edge of a tin bucket, L, (see also Figs. 9 and 10,) in which case it is formed with two ears $h$, $h$, on its outer periphery and with a projection, B, opposite to said ears.

D, is a metallic cover which is hinged into the ears, $h$, by a pin, $c$, as shown, and which is held in a closed condition by a device which will be presently described.

In the upper surface of the annular top rim, A, is formed a recess in which is inserted and fastened an India rubber cushion or packing ring, $a$, and on the under surface of the lid, D, is an annular projecting ring, or flange, $s$, which when said lid, D, is closed, comes down onto the rubber cushion, $a$.

In the projecting lug, B, of the top rim, A, is pivoted, or hinged by a pin, $c$, a holder strap, or retaining device, $b$. The shape of this retainer is clearly shown at Fig. 8, in perspective and at Figs. 1 and 2, in vertical section and top view. Said strap, $b$, it will be seen is provided with a screw bolt, $c$, which is furnished with a cross bar, $d$, by which it can be readily screwed down tightly by hand.

In the modification of my invention shown at Figs. 2, 4, 6–7, the rubber seat or cushion, $a$, is placed in the lid, D, and the flange, $s$, is on the top rim of the vessel, and the lid which in this instance is made entirely removable or detachable from the top rim is retained by a removable strap piece, H, which is formed with hook shaped ends $i$, $i$, that catch under a projecting ledge, or shoulder of rim, A, and said strap, H, is provided with a set screw, F, which comes down onto lid, D, and securely holds it down onto the top rim, A, forcing the flange, $s$, into its rubber cushion, $a$, to form an impervious joint.

S, is a removable seat piece which is constructed of metallic rim piece $s^2$, and a wooden rim, $s$, (see Figs. 9 and 10). The piece $s^2$ is made with a flange on its under side which just fits into the top rim, A, and comes down flush onto it—in Figs. 9 and 10. The application of the seat piece, S, is illustrated fully where it will be seen that to apply said seat piece it is only necessary to swing the lid, D, and handle, J, of the bucket, down at the sides, and out of the way. When the bucket is used the occupant on rising immediately removes the seat piece, S, and swinging the lid, D, up and over the top of the bucket vibrates the hinged retainer, $b$, into the position shown at Fig. 1, and turns the screw, F, down tightly, whereby the lid, D, is drawn down onto its seat with great force and the flange, $s$, embedded in the rubber cushion, $a$, so as to form a perfectly impervious joint. The bucket, L, may be made of any shape and size, and may be lined inside with glass if desired to prevent any absorption, so that when washed out it will be free of any smell. And I propose to fit up cases of wood to contain a bucket, and the removable seat and other appurtenances which will all close up, and look like a piece of furniture and be exceedingly portable.

The greatest utility in these apparatuses will be in their employment on ship board for ladies and also in sick chambers, where such an arrangement may be kept and used at different times without the least escape of smell when not in use.

The modification of cover fixture shown at Figs. 2, 4, 6 and 7 is particularly applicable to casks which I propose to substitute for boxes in privies and which can be securely and perfectly sealed, so that they can be carried off through the house and street in the day time without any escape of contents, or even the slightest escape of odor, the seat being fixed in such cases right onto the mouth nothing will ever get on the outside of the vessel, and as the cover is placed and secured on before the vessel is moved, it will be seen that it can be sealed and carried anywhere to be emptied or cleansed without the least inconvenience to any one. The bucket, L, should be made of height such that when the seat piece, S, is placed on, the latter will be at the proper elevation for the comfort of the occupant.

It is obvious that my invention is capable of application in many different forms and under various modifications.

What I claim as new, and desire to secure by Letters Patent, is—

The combined arrangement of the hinged lid D, with its flange $s$, the rubber packing $a$, and bucket L, with the removable seat piece, S, the whole constructed and operating as specified for the purposes set forth.

In testimony whereof I have hereunto set my hand this twenty-first day of June 1860.

ENOCH HIDDEN.

Witnesses:
J. N. McIntire,
Wm. C. McIntire.